(12) United States Patent
Hill

(10) Patent No.: US 8,851,272 B1
(45) Date of Patent: Oct. 7, 2014

(54) CONVEYOR SYSTEM WITH MULTIPLE LEVEL CONVERGENCE APPARATUS

(71) Applicant: Hilmot Corporation, Waukesha, WI (US)

(72) Inventor: Tony Hill, Wauwatosa, WI (US)

(73) Assignee: Hilmot Corporation, Waukesha, WI (US)

( * ) Notice: Subject to any disclaimer, the term of this patent is extended or adjusted under 35 U.S.C. 154(b) by 14 days.

(21) Appl. No.: 13/688,763

(22) Filed: Nov. 29, 2012

(51) Int. Cl.
  *B65G 37/00* (2006.01)
  *B65G 21/18* (2006.01)
  *B65G 21/16* (2006.01)
  *B65G 15/02* (2006.01)

(52) U.S. Cl.
  CPC ............. *B65G 37/00* (2013.01); *B65G 21/18* (2013.01); *B65G 2207/24* (2013.01); *B65G 21/16* (2013.01); *B65G 15/02* (2013.01)
  USPC .......................................... 198/778; 198/606

(58) Field of Classification Search
  CPC .... B65G 15/02; B65G 2207/24; B65G 21/18; B65G 21/16
  USPC .......................................... 198/601, 606, 778
  See application file for complete search history.

(56) References Cited

U.S. PATENT DOCUMENTS

| | | | | |
|---|---|---|---|---|
| 3,904,025 | A | * | 9/1975 | Garvey .......................... 198/778 |
| 4,319,676 | A | | 3/1982 | Turnbough |
| 5,413,213 | A | * | 5/1995 | Golz et al. ..................... 198/778 |
| 5,833,045 | A | * | 11/1998 | Osti et al. ...................... 198/444 |
| 6,550,602 | B2 | * | 4/2003 | Steeber et al. ............. 198/347.4 |
| 6,695,128 | B2 | | 2/2004 | Palmaer et al. |
| 7,775,344 | B2 | * | 8/2010 | Balk ............................. 198/778 |
| 8,328,004 | B2 | * | 12/2012 | Balk ............................. 198/778 |
| 8,522,960 | B2 | * | 9/2013 | Johnson ........................ 198/778 |
| 2002/0017531 | A1 | | 2/2002 | Adriani |
| 2011/0061993 | A1 | | 3/2011 | Seger et al. |

* cited by examiner

*Primary Examiner* — Leslie A Nicholson, III
(74) *Attorney, Agent, or Firm* — Haugen Law Firm PLLP

(57) ABSTRACT

A conveyor system and method is described for conveying articles between different levels of a structure. The conveyor system utilizes stacked helical shaped conveyors to move articles up from a first level and down from a third level to a common second level. The conveyor system may also move articles down from the second level to the first level or up from the second level to the third level. The stacked helical conveyors eliminate the need for gated lifts or ramps and also minimize the footprint required to convey articles between levels.

12 Claims, 6 Drawing Sheets

CONVEYOR SYSTEM WITH MULTIPLE LEVEL CONVERGENCE APPARATUS

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to an article or package conveyor systems, and more particularly, to multi level article or package conveyance systems that convey articles between multiple levels to or from a point of convergence.

BACKGROUND

Generally, conveying systems have been utilized in many business operations including assembly plants, packaging facilities, food processing, shipping, distribution centers, and other operations that have a need to effectively convey goods from one location to another. Prior conveyors have, for example, transported goods from one location to another location within a building along a belt or other continuous conveyor. Additionally, some buildings have multiple floors requiring a lift, ramp or other elevator to transport goods from one floor to another.

In the past, attempts have been made to bypass lifts and ramps by conveying goods up or down a continuous spiral conveyor. While spiral conveyor arrangements have attempted to transport goods from one level or floor to another, the present invention provides a merging or diverging among a plurality of distinct conveyors that are stacked and aligned vertically. In this manner, multiple distinct feed lines servicing multiple floors of a building may be combined into a single elevated delivery line. Conversely, a single feed line positioned on the second floor of a building, for example, may be diverged into a plurality of distinct delivery lines servicing multiple floors.

SUMMARY

Embodiments according to aspects of the invention include a helical conveyor system having a first helical conveyance path for conveyance in a first helical direction and a second helical conveyance path for conveyance in a second helical conveyance direction, where the first and second helical rotational conveyance directions are opposite one another. The second helical conveyance path is elevated above the first helical conveyance path and the paths share a common center axis and intersect at a convergence or intersection. Articles may be conveyed up the first helical conveyance path at the same time articles are conveyed down the second helical conveyance path.

Also described herein is a conveyor system for conveying articles along helical tracks having a common helical center axis. The tracks join together at a juncture and convey articles from stations at multiple levels. The helical tracks include drive mechanisms that convey articles along the track. A first drive mechanism drives articles up a lower portion of the track and a second drive mechanism drives articles down an upper portion of the helical track. In this manner, articles may be moved up from a first level to a second while simultaneously moving other articles down from a third level to the second level. An additional track may intersect the helical tracks at the second level.

Also described herein is a conveyor system for conveying articles that includes a first conveyor for conveying articles about a central transport axis in a first helical direction, wherein a portion of the first conveyor extends to a first station. The conveyor system also includes a second conveyor for conveying articles about a center axis in a second helical direction, where the central transport axis is linearly aligned with the center axis. In this conveyor system the first helical direction and second helical direction are diametrically opposed. A portion of the second conveyor extends to a second station and the second station is elevated above the first station. The conveyor system also includes a third station of a third conveyor for conveying to or from the first and second conveyors.

In an embodiment of the invention the first conveyor, second conveyor and third conveyor join at a juncture. The conveyor system may also include a fourth conveyor for conveying articles, wherein the fourth conveyor joins the first, second and third conveyors at the juncture. In an embodiment of the invention the first conveyor and the second conveyor have helical symmetry. The conveyor system of the invention may also include a first drive mechanism to convey articles from the first station towards the third station and the second conveyor includes a second drive mechanism to convey articles from the second station towards the third station.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Figure 1:
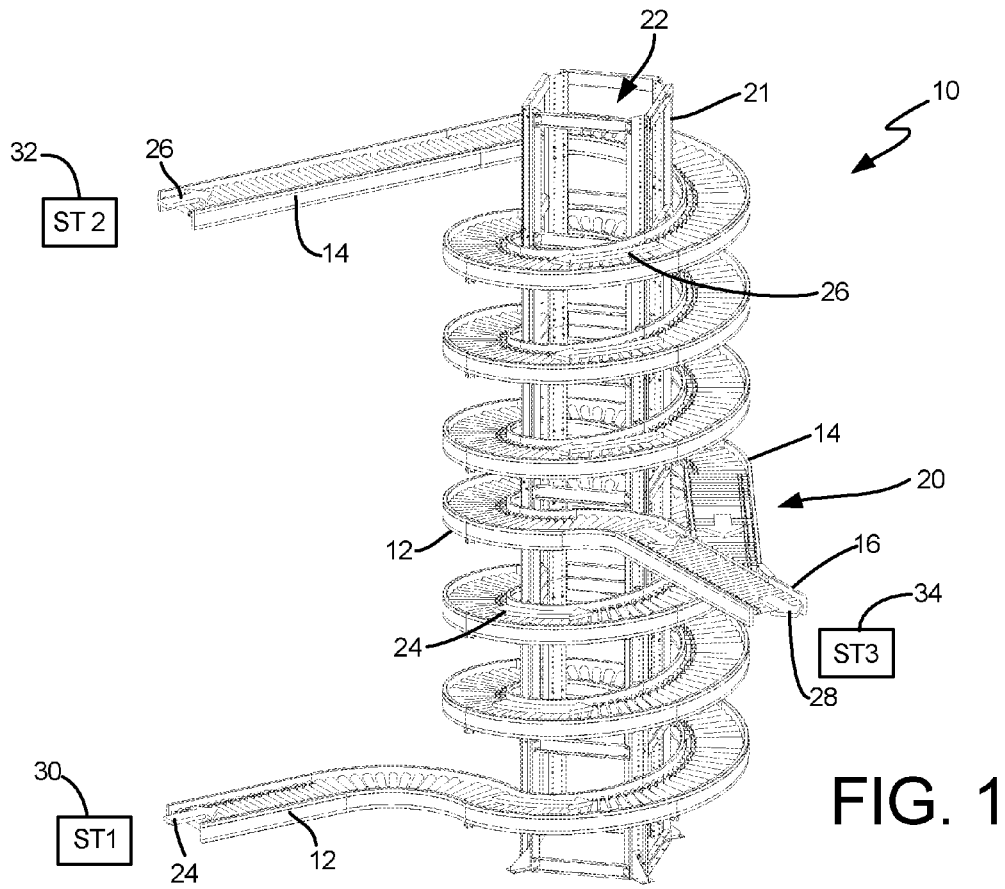
FIG. 1 is a front perspective view of a conveyor system in accordance with an embodiment of the invention.
Figure 2:
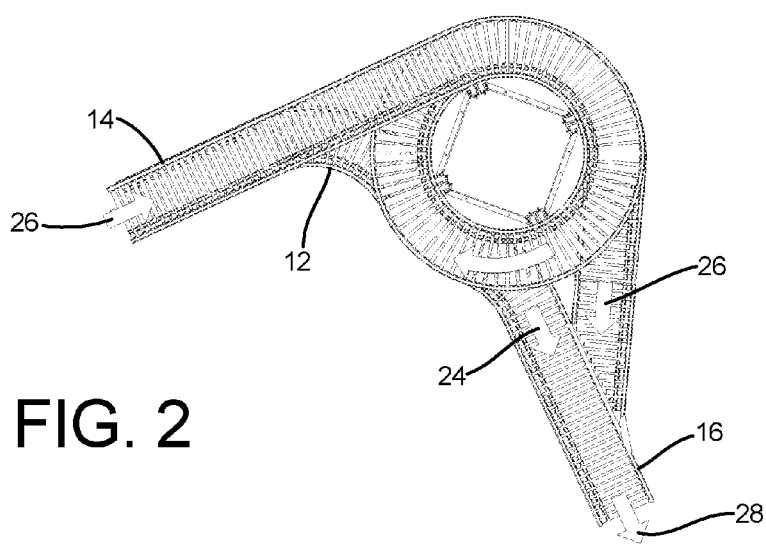
FIG. 2 is a top plan view of conveyor system of the type shown in FIG. 1.

Turning attention now to the Figures, embodiments of the conveyor system will now be described in more detail. With Reference to FIGS. 1 and 2 conveyor system 10 is shown having a first conveyor or track 12, second conveyor or track 14, and third conveyor or track 16. The first and second conveyors 12 and 14 converge or join together at juncture 20. Each conveyor 12-16 is formed from modular, linear or curved, track subsections of suitable known construction. A portion of conveyors 12 and 14 include sub sections that wrap around or wind about an axis 22. The windings about axis 22 are sufficiently spaced apart to allow the transport of goods along a continuous arc. The continuous arc of the first conveyor forms a first helical path about the axis 22 and the continuous arc of the second conveyor forms a second helical path about the axis 22. The helical windings are held in a spaced apart relation by frame 22. The helix formed by the continuous arc may be arranged to form a helix having helical symmetry. Third conveyor 16 extends from the intersection or juncture 20 of conveyors 12 and 14. Goods may be positioned onto the conveyors or removed from the conveyors at corresponding first, second, and third stations 30-34. Thus, the goods may be conveyed along conveyors 12 or 14 to the intersection 20 and merging onto third conveyor 16. Alternatively, goods may convey along third conveyor 16 to the juncture 20 where the goods diverge onto first and second conveyor tracks 12 and 14.

Figure 3:
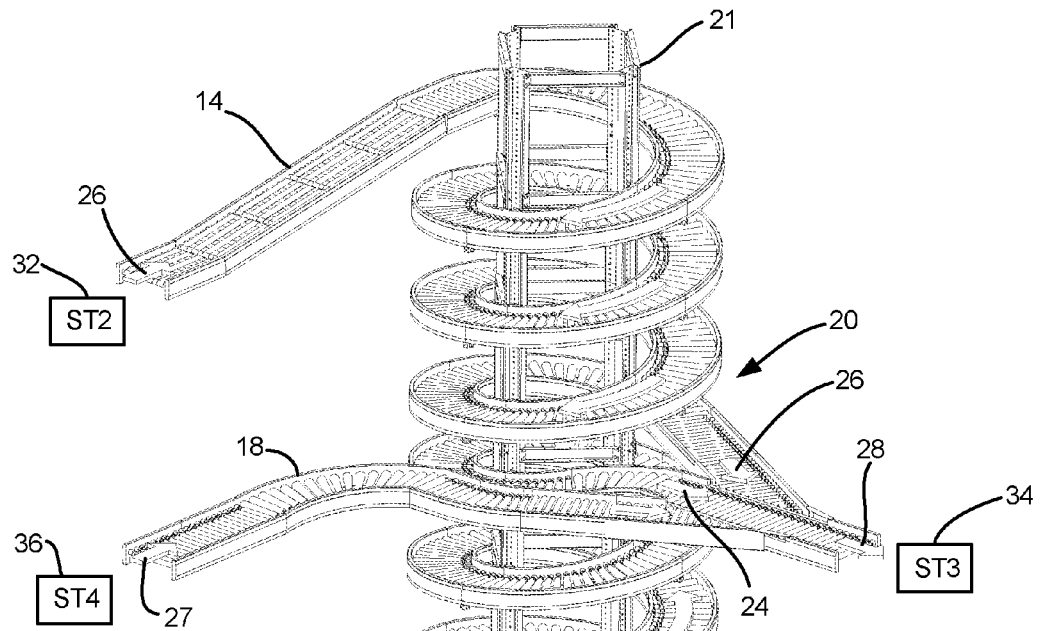
FIG. 3 is a front perspective view of a conveyor system in accordance with an embodiment of the invention.
Figure 4:
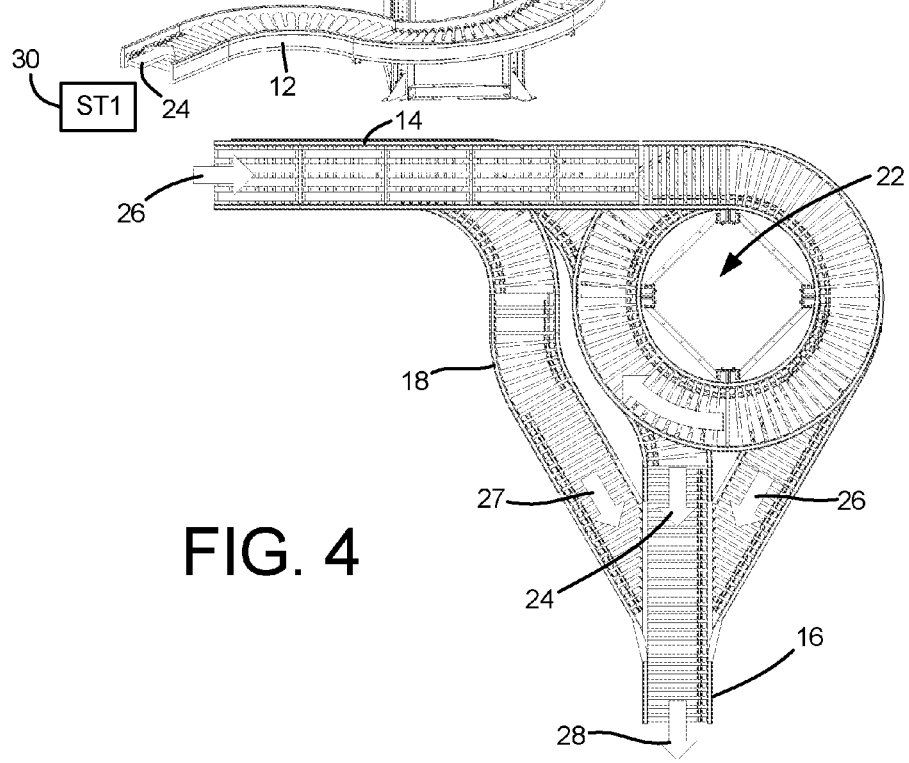
FIG. 4 is a top plan view of conveyor system of the type shown in FIG. 3.

With Reference to FIGS. 3 and 4 conveyor system 10 is shown having a first conveyor or track 12, second conveyor or track 14, third conveyor or track 16, and fourth conveyor or track 18. The first, second, third and fourth conveyors 12-18 converge or join together at juncture 20. Each conveyor 12-18 is formed from modular, linear or curved, track subsections of suitable known construction. A portion of conveyors 12 and 14 include sub sections that wrap around or wind about an axis 22. The windings about axis 22 are sufficiently spaced apart to allow the transport of goods along a continuous arc. The continuous arc of the first conveyor forms a first helical path about the axis 22 and the continuous arc of the second conveyor forms a second helical path about the axis 22. The helical windings are held in a spaced apart relation by frame 22. The helix formed by the continuous arc may be arranged to form a helix having helical symmetry. As shown in FIG. 1 the helical conveyance paths of the first and second conveyors 12 and 14 intersect at intersection or juncture 20. Third conveyor 16 extends from the intersection or juncture 20 of conveyors 12 and 14. Goods may be conveyed along conveyors 12, 14 or 16 to the intersection 20 and the goods merge onto third conveyor 16. Alternatively, goods may convey along third conveyor 16 to the juncture 20 where the goods diverge onto first, second or third conveyor tracks 12, 14 and 18. Goods may be positioned onto the conveyors or removed from the conveyors at corresponding first, second, third, and fourth stations 30-36.

Figure 5:
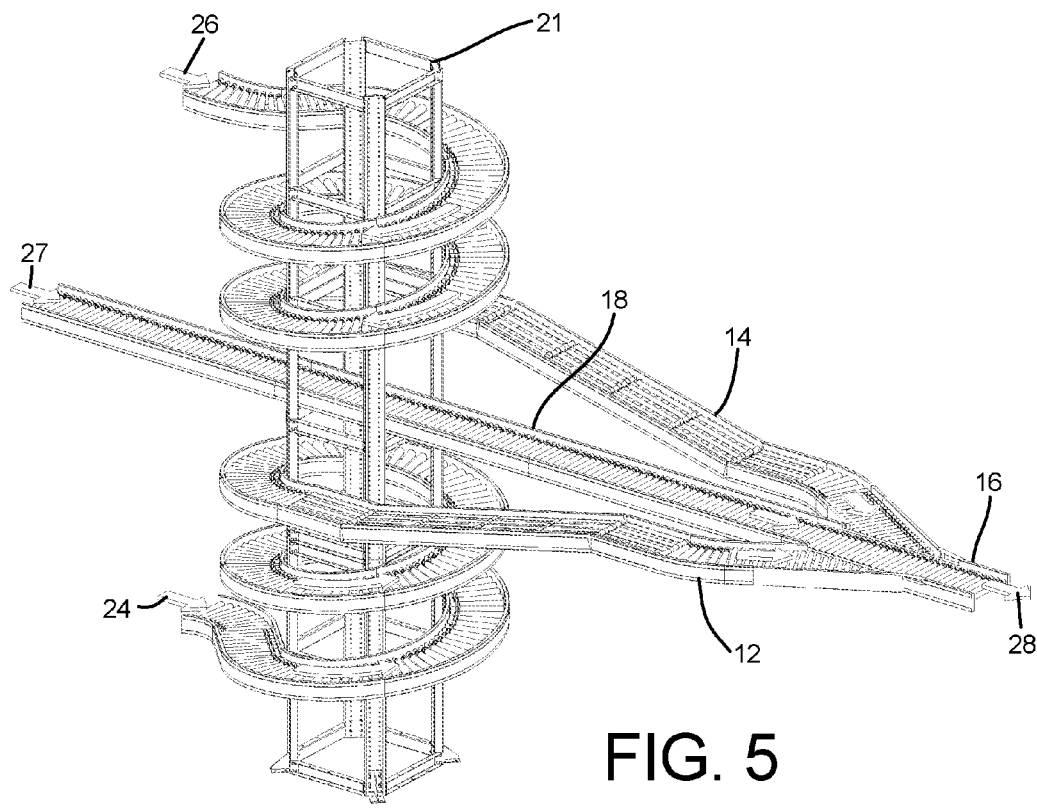
FIG. 5 is a front perspective view of a conveyor system in accordance with an embodiment of the invention.
Figure 6:
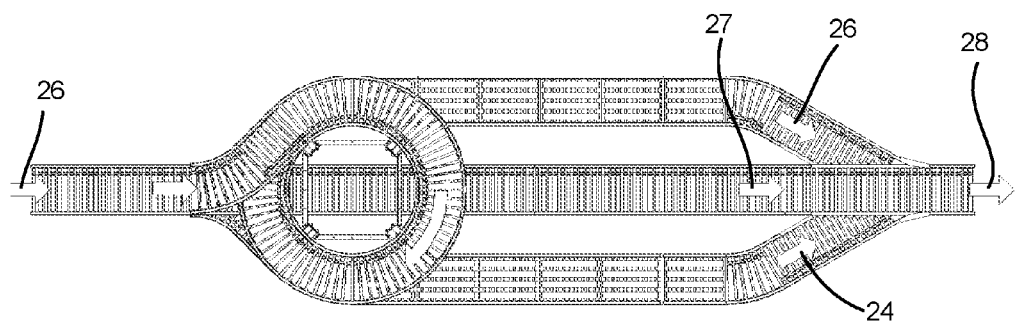
FIG. 6 is a top plan view of conveyor system of the type shown in FIG. 5.

FIGS. 5 and 6 illustrate an alternative embodiment of the conveyor system 10. First conveyor or track 12, second conveyor or track 14, third conveyor or track 16, and fourth conveyor or track 18 are constructed similar to the embodiment described in conjunction with FIGS. 3 and 4. The first, second, third and fourth conveyors 12-18 converge or join together at juncture 20. However, the first conveyor 12 intersects with fourth conveyor 18 on a first side of the fourth conveyor 18 and the second conveyor 14 intersects with the fourth conveyor 18 on a second side of the fourth conveyor 18.

Figure 7:
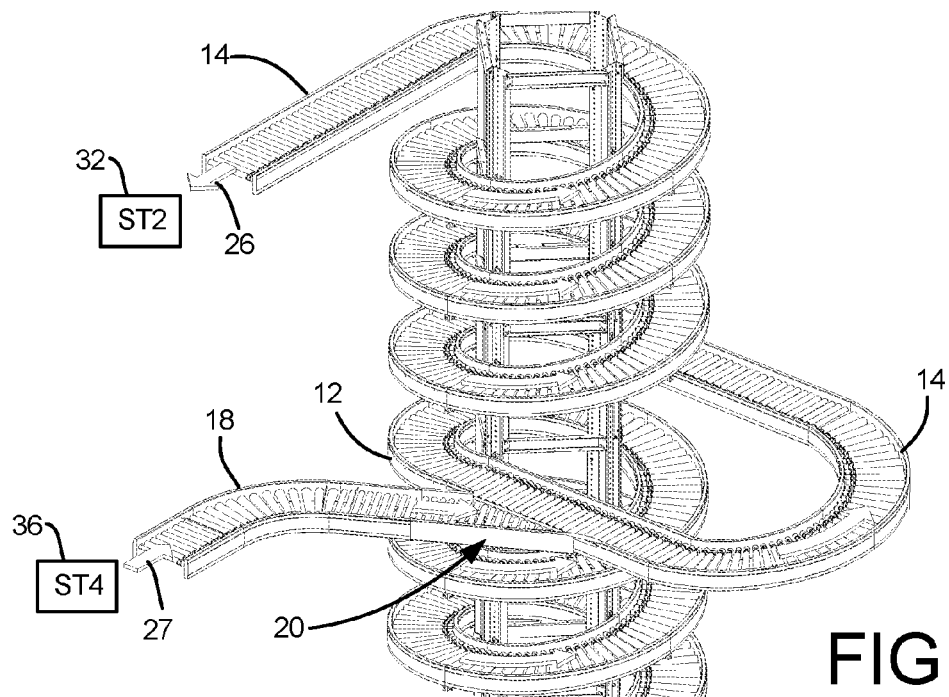
FIG. 7 is a front perspective view of a conveyor system in accordance with an embodiment of the invention.
Figure 8:
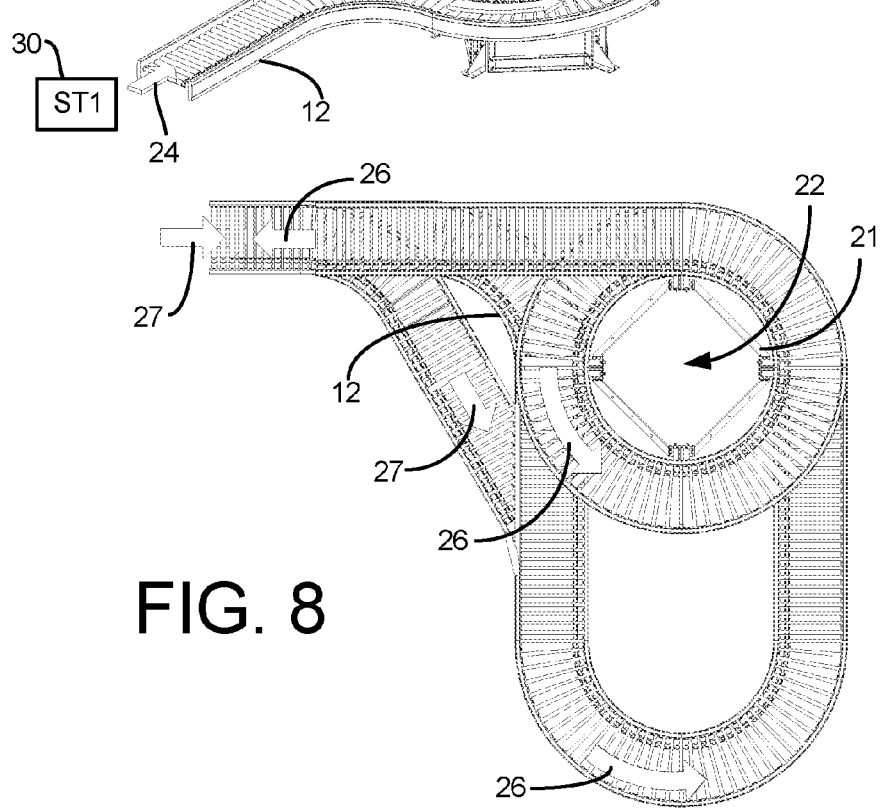
FIG. 8 is a top plan view of conveyor system of the type shown in FIG. 7.

FIGS. 7 and 8 illustrate an alternative embodiment of the conveyor system. Conveyor system 10 is shown having a first conveyor or track 12, second conveyor or track 14, and fourth conveyor or track 18. The first, second, and fourth conveyors 12, 14 and 18 converge or join together at juncture 20. First conveyor 12 and intersects with fourth conveyor 18 and fourth conveyor further intersects with second conveyor 14. Each conveyor 12, 14 and 18 is formed from modular, linear or curved, track subsections of suitable known construction. Similar to other embodiments, conveyors 12 and 14 include sub sections that wrap around or wind about an axis 22 to form helical paths about the axis 22.

Figure 9:
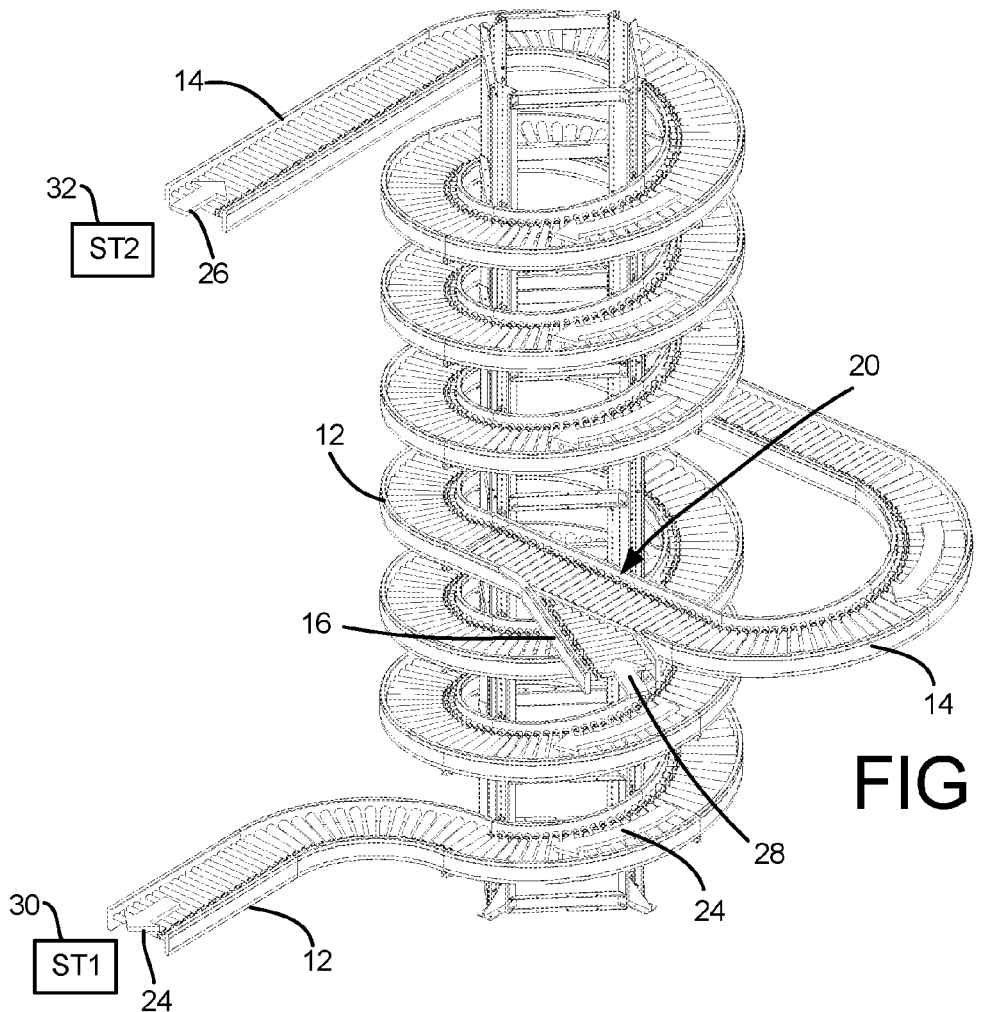
FIG. 9 is a front perspective view of a conveyor system in accordance with an embodiment of the invention.
Figure 10:
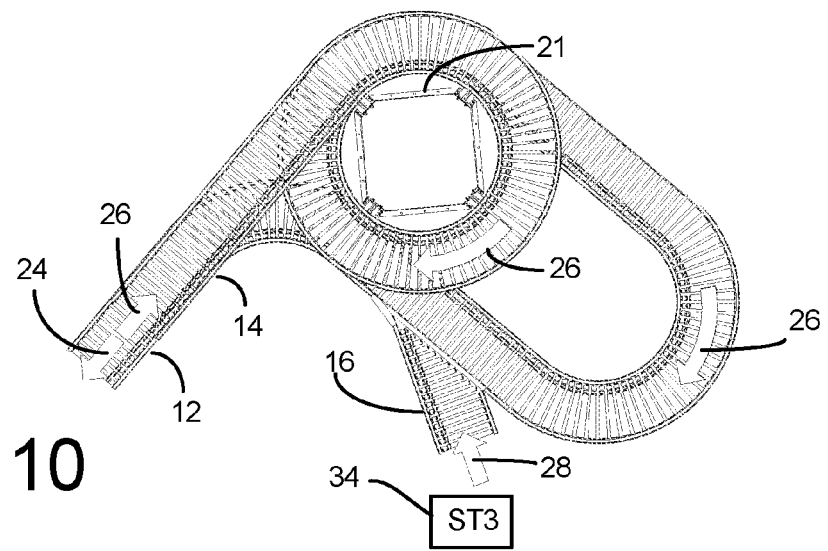
FIG. 10 is a top plan view of conveyor system of the type shown in FIG. 9.

FIGS. 9 and 10 illustrate an alternative embodiment of the conveyor system. Conveyor system 10 is shown having a first conveyor or track 12, second conveyor or track 14, and third conveyor or track 16. The first, second, and third conveyors 12, 14 and 16 converge or join together at juncture 20. First conveyor 12 and intersects with third conveyor 16 and third conveyor 16 further intersects with second conveyor 14. Each conveyor 12-16 is formed from modular, linear or curved, track subsections of suitable known construction. Similar to other embodiments, conveyors 12 and 14 include sub sections that wrap around or wind about an axis 22 to form helical paths about the axis 22.

Exemplary flows of the goods or articles along the conveyors are depicted in the Figures with directional arrows. With reference to FIGS. 1 and 2 goods may be positioned on the first conveyor at first station 30. Arrow 24 depicts that the goods or articles are conveyed up the helix to intersection 20. The articles then travel out of the helix along third conveyor 16 to the third station 34 in a direction represented by arrow 28. Goods or articles positioned on the second conveyor at second station 32 are conveyed down the helix to intersection 20 as depicted by arrow 26. The articles travel down the helical path and out the helix along third conveyor 16 to the third station 34.

With reference to FIGS. 3-6 goods may be positioned on the first conveyor at first station 30. Arrow 24 depicts that the goods or articles are conveyed up the helix to intersection 20. The articles then travel out of the helix along third conveyor 16 to the third station 34 in a direction represented by arrow 28. Goods or articles positioned on the second conveyor at second station 32 are conveyed down the helix to intersection 20 as depicted by arrow 26. The articles travel down the helical path and out the helix along third conveyor 16 to the third station 34. Goods or articles positioned on the fourth conveyor at fourth station 36 are intersect the helix formed by first and second conveyors and then travel out the helical path along the third conveyor 16 to the third station 34.

With reference to FIGS. 7 and 8, goods may be positioned on the first conveyor at first station 30. Arrow 24 depicts that the goods or articles are conveyed up the helix to intersection 20. The articles then continue to travel up the helix along second conveyor 14 to the second station 32 in a direction represented by arrow 26. Goods or articles positioned on the fourth conveyor at fourth station 36 are conveyed to the helix intersection 20 as depicted by arrow 27. The articles then continue to travel up the helical path and out the helix along second conveyor 14 to the second station 32.

With reference to FIGS. 9 and 10 goods may be positioned on the second conveyor at second station 32. Arrow 26 depicts that the goods or articles are conveyed down the helix to intersection 20. The articles then continue to travel down the helix along first conveyor 12 to the first station 30 in a direction represented by arrow 24. Goods or articles positioned on the third conveyor at third station 34 are conveyed along conveyor 16 to the helix intersection 20 as depicted by arrow 28. The articles then travel down the helical path and out the helix along first conveyor 12 to the first station 30.

Figure 11:
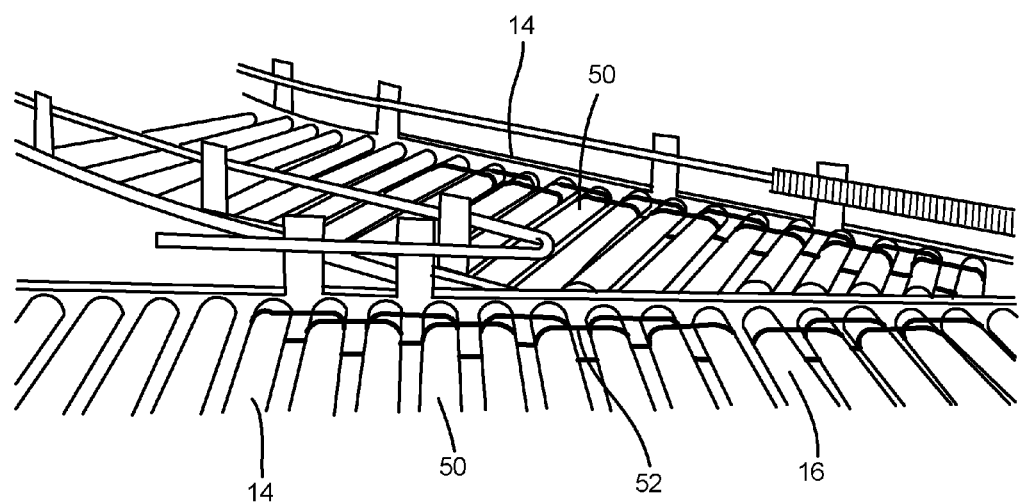
FIG. 11 is a partial sectional perspective view of a juncture within a conveyor system in accordance with an embodiment of the invention.

Referring now to FIG. 11 a portion of the junction of first conveyor 14 and second conveyor 16 is shown. Each section of the conveyor includes a plurality of spaced apart rollers. Select rollers 50 are linked together with linkages 52, and one or more motors (not shown) are coupled to one or more corresponding drive rollers. When the motors rotate the drive rollers all of the linked rollers will likewise rotate. A controller of suitable known construction (not shown) is used to activate and deactivate the motors. Each conveyor 12-18 has independent motors and controllers that serve as a drive mechanism to convey articles along the track in a desired direction. As seen in FIGS. 1-8, the motorized drive rollers of first conveyor 12, conveys articles along the first conveyor up the helical path towards junction 20. The motorized drive rollers of second conveyor 14, conveys articles along the second conveyor down the helical path toward juncture 20 in FIGS. 1-6 and 9-10 and conveys articles up the second conveyor 14 from the juncture 20 in FIGS. 7-8. Those skilled in the art will appreciate that the direction of rotation of the motorized drive rollers may be reversed so that the motorized drive rollers of conveyors will convey articles in an opposite direction, if desired.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A conveyor system for conveying articles, said system comprising:
    a first track for conveying articles, said first track forming a first track helix about a transport axis at a first region and wherein a portion of said first track extends to a first station;
    a second track for conveying articles, said second track forming a second track helix about said transport axis at a second region elevated above said first region, wherein a portion of said second track extends to a second station;
    a third track for conveying articles; and
    a juncture wherein said first track, second track and third track join at said juncture.

2. A conveyor system as recited in claim 1, wherein said first track has an intersection end and said second track has an intersection end that are positioned to convey articles to and from said third track at said juncture.

3. A conveyor system as recited in claim 1, further including a frame that supports said first track at said first region and supports said second track at said second region.

4. A conveyor system as recited in claim 1, further including a fourth track for conveying articles, wherein said fourth track joins said first, second and third tracks at said juncture.

5. A conveyor system as recited in claim 1 wherein said first track includes a first drive mechanism to conveyor articles from said first region towards said second region and said second track includes a second drive mechanism to convey articles from said second region towards said first region.

6. A conveyor system as recited in claim 1 wherein said first track conveys articles in a direction about said transport axis that is opposite a direction that said second track conveys articles about said transport axis.

7. A conveyor system as recited in claim 1, wherein said first track helix and said second track helix have helical symmetry.

8. A conveyor system for conveying articles, said system comprising:
    a first track for conveying articles, said first track forming a first track helix about a transport axis at a first region and wherein a portion of said first track extends to a first station;
    a second track for conveying articles, said second track forming a second track helix about said transport axis at a second region elevated above said first region, wherein a portion of said second track extends to a second station;
    a third track for conveying articles; and
    a juncture wherein said first track, second track and third track join at said juncture and further wherein said first track helix and said second track helix have helical symmetry.

9. A conveyor system as recited in claim 8, wherein said first track has an intersection end and said second track has an intersection end that are positioned to convey articles to and from said third track at said juncture.

10. A conveyor system as recited in claim 8, further including a frame that supports said first track at said first region and supports said second track at said second region.

11. A conveyor system as recited in claim 8 wherein said first track includes a first drive mechanism to conveyor articles from said first region towards said second region and said second track includes a second drive mechanism to convey articles from said second region towards said first region.

12. A conveyor system as recited in claim 8 wherein said first track conveys articles in a direction about said transport axis that is opposite a direction that said second track conveys articles about said transport axis.

* * * * *